United States Patent
Wu

(10) Patent No.: US 11,520,196 B2
(45) Date of Patent: Dec. 6, 2022

(54) LIGHT ADJUSTING GLASS

(71) Applicants: Beijing BOE Optoelectronics Technology Co., Ltd., Beijing (CN); BOE TECHNOLOGY GROUP CO., LTD., Beijing (CN)

(72) Inventor: Xiaojuan Wu, Beijing (CN)

(73) Assignees: Beijing BOE Optoelectronics Technology Co., Ltd., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 3 days.

(21) Appl. No.: 17/251,867

(22) PCT Filed: May 14, 2020

(86) PCT No.: PCT/CN2020/090208
§ 371 (c)(1),
(2) Date: Dec. 14, 2020

(87) PCT Pub. No.: WO2020/238634
PCT Pub. Date: Dec. 3, 2020

(65) Prior Publication Data
US 2021/0255496 A1   Aug. 19, 2021

(30) Foreign Application Priority Data
May 24, 2019 (CN) .......................... 201910441573.0

(51) Int. Cl.
G02F 1/1347 (2006.01)
B32B 17/10 (2006.01)
(Continued)

(52) U.S. Cl.
CPC .... G02F 1/13478 (2021.01); B32B 17/10036 (2013.01); B32B 17/10504 (2013.01);
(Continued)

(58) Field of Classification Search
CPC .......... G02F 1/13478; G02F 1/134309; G02F 1/1391; G02F 1/155; G02F 2201/44;
(Continued)

(56) References Cited

FOREIGN PATENT DOCUMENTS

| CN | H1165462 A | 3/1999 |
|---|---|---|
| CN | 101738810 A | 6/2010 |

(Continued)

OTHER PUBLICATIONS

China Patent Office, First Office Action dated Oct. 21, 2019, for corresponding Chinese application 201920761227.6.

*Primary Examiner* — Nathanael R Briggs
(74) *Attorney, Agent, or Firm* — Houtteman Law LLC

(57) ABSTRACT

The present disclosure provides a light adjusting glass, including: a basic light adjusting structure and a functional light adjusting structure which are disposed in a laminated manner; the basic light adjusting structure is configured to adjust a transmittance of light rays irradiated on the basic light adjusting structure; the functional light adjusting structure is configured to reflect light rays in a specific wave band irradiated on the functional light adjusting structure.

10 Claims, 10 Drawing Sheets

(51) Int. Cl.
  *E06B 3/67* (2006.01)
  *E06B 9/24* (2006.01)
  *G02F 1/1343* (2006.01)
  *G02F 1/139* (2006.01)
  *G02F 1/155* (2006.01)
  *B60J 3/04* (2006.01)

(52) U.S. Cl.
  CPC ...... *B32B 17/10513* (2013.01); *E06B 3/6722* (2013.01); *E06B 9/24* (2013.01); *G02F 1/1391* (2013.01); *G02F 1/134309* (2013.01); *G02F 1/155* (2013.01); *B60J 3/04* (2013.01); *E06B 2009/2464* (2013.01); *G02F 2201/44* (2013.01)

(58) Field of Classification Search
  CPC ........ B32B 17/10036; B32B 17/10504; B32B 17/10513; E06B 3/6722; E06B 9/24; E06B 2009/2464; B60J 3/04
  See application file for complete search history.

(56) References Cited

FOREIGN PATENT DOCUMENTS

| | | | | |
|---|---|---|---|---|
| CN | 104793381 | A | 7/2015 | |
| CN | 105652549 | A | 6/2016 | |
| CN | 105759469 | A | 7/2016 | |
| CN | 108919552 | A * | 11/2018 | ........... B29C 64/129 |
| CN | 109521620 | A | 3/2019 | |
| CN | 210090881 | U | 2/2020 | |
| CN | 210488184 | U | 5/2020 | |
| CN | 210514886 | U | 5/2020 | |

* cited by examiner

LIGHT ADJUSTING GLASS

CROSS-REFERENCE TO RELATED APPLICATIONS

The present application claims the priority of Chinese Patent Application No. 201910441573.0, filed on May 24, 2019, the contents of which are incorporated herein in their entirety by reference.

TECHNICAL FIELD

The present disclosure relates to the technical field of intelligent glass, and in particular, relates to a light adjusting glass.

BACKGROUND

At present, light adjusting glasses are more and more widely applied in the fields of building and traffic, and the fields of automobile, high-speed train, passenger aircraft and the like are interest in light adjusting glass with dye liquid crystal. Products such as PDLC (polymer dispersed liquid crystal) intelligent glass, electro-chromic intelligent glass and the like exist in an intelligent glass market. The PDLC intelligent glass can only realize switching between transparency and haze, and does not block light or heat; the electro-chromic intelligent glass has problems of complex film layer process, slow response speed (after 8 s to 20 s), bluish color in a dark state and the like. The light adjusting glass with dye liquid crystal realizes switching between a bright state and a dark state by utilizing a selective absorption of dichroic dye molecules in liquid crystal to light, and compared with a conventional PDLC intelligent glass and a conventional electro-chromic intelligent glass, greatly improves optical properties such as black state purity, response speed and the like. However, the existing light adjusting glass with dye liquid crystal can only realize an adjustment between a black state, a bright state and a gray scale state, that is, can only adjust a light transmittance of the glass to visible light, and cannot meet more requirements of users.

SUMMARY

An embodiment of the present disclosure provides a light adjusting glass, including: a basic light adjusting structure and a functional light adjusting structure which are disposed in a laminated manner; where,
the basic light adjusting structure is configured to adjust a transmittance of light rays irradiated on the basic light adjusting structure;
the functional light adjusting structure is configured to reflect light rays, in a specific wave band, irradiated on the functional light adjusting structure.

In some implementations, the functional light adjusting structure includes: a first substrate and a second substrate which are disposed opposite to each other; and a first liquid crystal layer interposed between the first substrate and the second substrate; where,
the first liquid crystal layer is configured to reflect light rays in a specific wave band under an action of an electric field generated between the first substrate and the second substrate.

In some implementations, the first liquid crystal layer includes a bistable liquid crystal layer.

In some implementations, the first substrate includes a first base, and a first electrode disposed on a side of the first base proximal to the bistable liquid crystal layer;
the second substrate includes a second base and a second electrode disposed on a side of the second base proximal to the bistable liquid crystal layer; where,
the first electrode and the second electrode are both plate-shaped electrodes.

In some implementations, the first substrate includes a first base, and a first electrode disposed on a side of the first base proximal to the first liquid crystal layer;
the second substrate includes a second base and a second electrode disposed on a side of the second base proximal to the bistable liquid crystal layer; where,
the first electrode and the second electrode are both slit electrodes, and the first electrode and the second electrode are disposed in a crossed mode.

In some implementations, the first substrate includes a first base, and a first electrode disposed on a side of the first base proximal to the bistable liquid crystal layer;
the second substrate includes a second base and a second electrode disposed on a side of the second base proximal to the bistable liquid crystal layer; where,
at least one of the first base and the second base proximate to the base light adjusting structure is a flexible substrate.

In some implementations, the basic light adjusting structure includes a third substrate, a fourth substrate, and a second liquid crystal layer interposed between the third substrate and the fourth substrate; where,
the second liquid crystal layer includes basic liquid crystal molecules and dichroic dye molecules, which are deflected under the control of an electric field generated between the third substrate and the fourth substrate to control the transmittance of light rays.

In some implementations, the second liquid crystal layer include chiral additive.

In some implementations, the third substrate includes a third base, and a third electrode disposed on a side of the third base proximal to the second liquid crystal layer;
the fourth substrate includes a fourth base and a fourth electrode disposed on a side of the fourth base proximal to the second liquid crystal layer; where,
the third electrode and the fourth electrode are both plate-shaped electrodes.

In some implementations, the basic light adjusting structure includes a third substrate, a fourth substrate, and an electro-chromic layer interposed between the third substrate and the fourth substrate; where,
the electro-chromic layer controls light rays to transmit there-through or not under the control of an electric field generated between the third substrate and the fourth substrate.

In some implementations, the functional light adjusting structure includes a first base and a second base which are disposed opposite to each other, a first electrode disposed on a side of the first base proximal to the second base, a second electrode disposed on a side of the second base proximal to the first base, and a first liquid crystal layer disposed between the first electrode and the second electrode;
the basic light adjusting structure includes a third base and a fourth base which are disposed opposite to each other, a third electrode disposed on a side of the third base proximal to the fourth base, a fourth electrode disposed on a side of the fourth base proximal to the third base, and a second liquid crystal layer disposed between the third electrode and the fourth electrode; where,
the second base and the third base are common.

In some implementations, the functional light adjusting structure includes a first base and a second base which are disposed opposite to each other, a first electrode disposed on a side of the first base proximal to the second base, a second electrode disposed on a side of the second base proximal to the first base, and a first liquid crystal layer disposed between the first electrode and the second electrode;

the basic light adjusting structure includes a third base and a fourth base which are disposed opposite to each other, a third electrode disposed on a side of the third base proximal to the fourth base, a fourth electrode disposed on a side of the fourth base proximal to the third base, and an electrochromic layer disposed between the third electrode and the fourth electrode; where, the second base and the third base are common.

DESCRIPTION OF EMBODIMENTS

Figure 1:
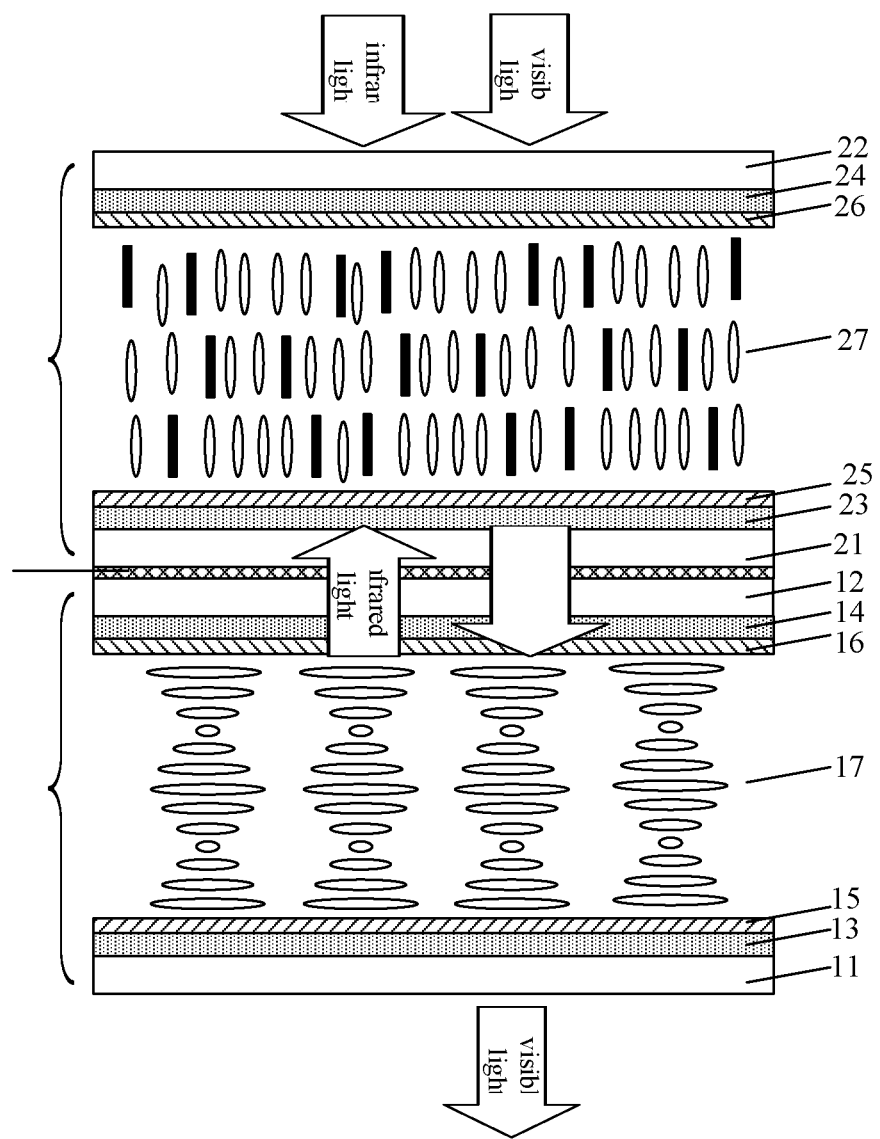
FIG. 1 is a schematic structural diagram of a light adjusting glass, in which a basic light adjusting structure is in a bright state and bistable liquid crystal is in a P state, according to an embodiment of the present disclosure.

In order to make technical solutions of the present disclosure better understood by one of ordinary skill in the art, the technical solutions of the present disclosure are described in further detail below with reference to the accompanying drawings and the detailed description.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. Furthermore, the use of terms "a", "an" or "the" and similar referents do not denote a limitation of quantity, but rather denote a presence of at least one. The word "including" or "includes", and the like, is intended to mean that an element or item preceding the word includes an element or item listed after the word and its equivalent, but not an exclusion of other elements or items. The term "bonding" and the like are not restricted to physical or mechanical bonding, but may include electrical bonding, whether direct or indirect. Terms "upper", "lower", "left", "right", and the like are used only to indicate relative positional relationships, and when an absolute position of an object being described is changed, the relative positional relationships may also be changed accordingly.

The so-called bistable liquid crystal in the following examples can exhibit a P state (planar state), an H state (isotropic state), and an FC state (focal conic state) under an action of an electric field.

When an electric field with a certain intensity is applied to the bistable liquid crystal in the P state, the bistable liquid crystal can be converted from the P state to the FC state, a spiral shaft of the bistable liquid crystal is randomly distributed, and a basic orientation of the spiral shaft is parallel to a substrate. When the electric field becomes zero, the FC state constitutes another zero-field stable state under certain conditions. The bistable liquid crystal in the FC state has no spiral structure with a periodicity and exhibits a multi-domain state, but each domain includes a spiral structure therein, so that the bistable liquid crystal in the FC state scatters incident light. If an electric field with a sufficient intensity is applied to the liquid crystal, the liquid crystal would change into an H state in which liquid crystal molecules are aligned in a direction of the electric field and the liquid crystal is transparent. For the bistable liquid crystal in the H state, when the applied electric field rapidly drops to zero, the liquid crystal molecules return to the P state; and when the applied electric field is slowly reduced, the liquid crystal molecules are transformed into the FC state.

An embodiment of the present disclosure provides a light adjusting glass, including a basic light adjusting structure and a functional light adjusting structure which are disposed in a laminated manner; the basic light adjusting structure is configured to adjust a transmittance of light rays irradiated on the basic light adjusting structure; the functional light adjusting structure is configured to reflect light rays in a specific wave band irradiated on the functional light adjusting structure.

In the related art, the light adjusting glass generally includes only one light adjusting structure for adjusting the transmittance of light rays passing through the light adjusting structure; but the light adjusting glass in the embodiment of the present disclosure includes the basic light adjusting structure and the functional light adjusting structure, and the basic light adjusting structure can adjust the transmittance of light rays irradiated on the basic light adjusting structure, and the functional light adjusting structure can reflect light rays in the specific wave band irradiated on the functional light adjusting structure, consequently through a cooperation of these two light adjusting structures, not only the transmittance of light rays can be adjusted, but also a portion of light rays can be selected to transmit, so as to improve user's experiences.

A specific structure of the light adjusting glass and functions that can be achieved by the light adjusting glass in the embodiment of the present disclosure will be specifically described below.

Referring to FIGS. 1 to 4, an embodiment of the present disclosure provides an anti-infrared intelligent light adjusting glass including a basic light adjusting structure 20 and a functional light adjusting structure 10, which are stacked together; where, the basic light adjusting structure 20 and the functional light adjusting structure 10 may be bonded together by an adhesive layer 30. The basic light adjusting structure 20 can control the transmittance of light rays transmitting there-through; the functional light adjusting structure 10 reflects infrared light in certain situations.

The basic light adjusting structure 20 and the functional light adjusting structure 10 each may adopt a liquid crystal cell structure.

Specifically, the functional light adjusting structure 10 may include a first substrate and a second substrate which are disposed opposite to each other, and a first liquid crystal layer 17 interposed between the first substrate and the second substrate; the first liquid crystal layer 17 may include bistable liquid crystal that can reflect infrared light. Under an action of an electric field between the first substrate and the second substrate, the bistable liquid crystal may be in the P state, the H state and the FC state.

Specifically, the first substrate of the functional light adjusting structure 10 may include a first base 11, a first electrode 13 and a first alignment layer 15 sequentially disposed on the first base 11; the second substrate of the functional light adjusting structure 10 is disposed opposite to the first substrate, and the second substrate may include a second base 12, and a second electrode 14 and a second alignment layer 16 sequentially disposed on a side of the second base 12 proximal to the first base 11; a first liquid crystal layer 17 is disposed between the first alignment layer 15 and the second alignment layer 16; the first liquid crystal layer 17 may specifically include bistable liquid crystal that reflects infrared light.

When the bistable liquid crystal is in the P state, visible light can normally transmit through the functional light adjusting structure 10, and infrared light is reflected by the bistable liquid crystal; when the bistable liquid crystal is in the H state, both visible light and infrared light can transmit through the functional light adjusting structure 10; and when the bistable liquid crystal is in the FC state, visible light and infrared light are scattered.

The first electrode 13 and the second electrode 14 each may be a plate-shaped electrode.

The basic light adjusting structure 20 may include: a third substrate and a fourth substrate which are disposed opposite to each other; and a second liquid crystal layer 27 interposed between the third substrate and the fourth substrate; where the second liquid crystal layer 27 is configured to be deflected under control of an electric field generated between the third substrate and the fourth substrate, so as to control the transmittance of light rays transmitting through the second liquid crystal layer 27.

Specifically, the third substrate of the basic light adjusting structure 20 may include a third base 21, a third electrode 23 and a third alignment layer 25 sequentially disposed on the third base 21; the fourth substrate of the basic light adjusting structure 20 may include a fourth base 22 disposed opposite to the third base 21, and a fourth electrode 24 and a fourth alignment layer 26 sequentially disposed on a side of the fourth base 22 proximal to the third base 21; the second liquid crystal layer 27 is disposed between the third alignment layer 25 and the fourth alignment layer 26; where the second liquid crystal layer 27 includes dye liquid crystal, i.e., liquid crystal molecules and doped dichroic dye molecules. The third electrode 23 and the fourth electrode 24 each may be a plate-shaped electrode, i.e., the basic light adjusting structure 20 may be a VA-type liquid crystal cell. Pretilt angles of the liquid crystal molecules with respect to the third alignment layer 25 and the fourth alignment layer 26 are perpendicular to each other. When no voltage is applied to the third electrode 23 and the fourth electrode 24, the liquid crystal molecules and the dichroic dye molecules in the second liquid crystal layer 27 are oriented perpendicular to the third substrate and the fourth substrate, so that incident light can transmit through, the basic light adjusting structure 20 is in a bright state, when voltages are applied to the third electrode 23 and the fourth electrode 24, and the electric field generated between the third electrode 23 and the fourth electrode 24 controls the liquid crystal molecules and the dichroic dye molecules to be orientated parallel to the third substrate and the fourth substrate, the incident light along a direction of long axis of the dichroic dye molecules is absorbed, and the basic light adjusting structure 20 is in a dark state, certainly, when voltages are applied to the third electrode 23 and the fourth electrode 24, and the electric field generated between the third electrode 23 and the fourth electrode 24 controls the liquid crystal molecules and the dichroic dye molecules to be orientated at an acute angle or an obtuse angle with respect to the third substrate and the fourth substrate, a portion of the incident light can transmit through the basic light adjusting structure 20, so that the basic light adjusting structure 20 is in a gray scale state.

In order to reduce the light transmittance of the basic light adjusting structure 20 in the dark state and increase a contrast ratio thereof, chiral additive may be included in the second liquid crystal layer 27.

In some implementations, as shown in FIG. 1, when the basic light adjusting structure 20 is in the bright state and the bistable liquid crystal in the functional light adjusting structure 10 is in the P state, visible light can normally transmit through the light adjusting glass, while infrared light is reflected by the bistable liquid crystal, and the anti-infrared intelligent light adjusting glass is in an anti-infrared mode, so as to achieve an anti-infrared effect. The light adjusting glass of the embodiment of the present disclosure can be applied to the fields of building, vehicle window and the like, and when a temperature is relative high in summer, the anti-infrared mode can be started while the light adjusting glass is light-transmitting, infrared light is prevented from entering indoors or vehicle windows, an indoor temperature is reduced, an energy consumption of an indoor or in-vehicle air conditioner can be reduced, and an energy-saving effect is achieved.

Figure 2:
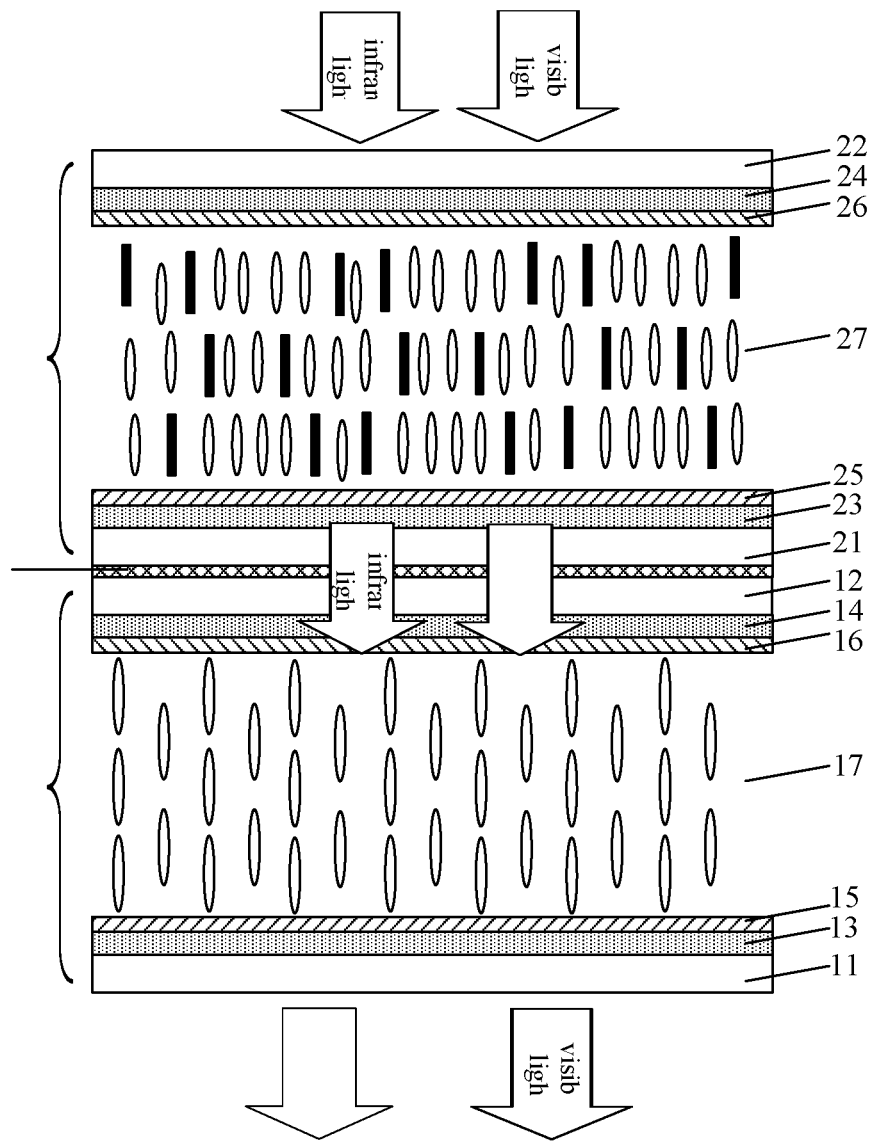
FIG. 2 is a schematic structural diagram of a light adjusting glass, in which a basic light adjusting structure is in a bright state and bistable liquid crystal is in an H state, according to an embodiment of the present disclosure.

In some implementations, as shown in FIG. 2, when the basic light adjusting structure 20 is in the bright state and the bistable liquid crystal in the functional light adjusting structure 10 is in the H state, both visible light and infrared light can transmit through the light adjusting glass. When a temperature is relative low in winter, the light adjusting glass is in such state, i.e., the basic light adjusting structure 20 is in the bright state and the bistable liquid crystal in the functional light adjusting structure 10 is in the H state, and the infrared rays irradiate indoors or vehicle windows, the indoor temperature is increased, the energy consumption of an indoor or in-vehicle air conditioner can be reduced, and the energy-saving effect is achieved.

Figure 3:
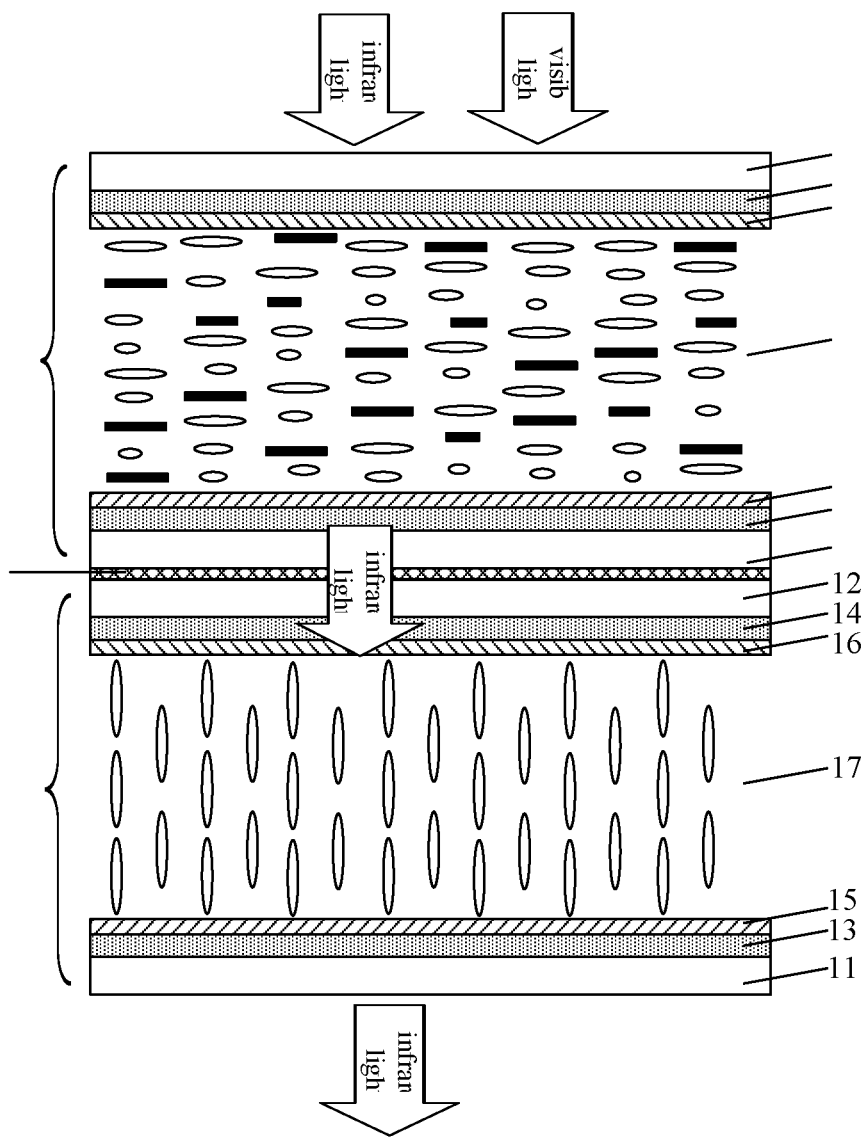
FIG. 3 is a schematic structural diagram of a light adjusting glass, in which a basic light adjusting structure is in a dark state and bistable liquid crystal is in an H state, according to an embodiment of the present disclosure.

In some implementations, as shown in FIG. 3, when the base light adjusting structure 20 is in the dark state and the bistable liquid crystal in the functional light adjusting structure 10 is in the H state, only infrared light can transmit through the light adjusting glass.

Figure 4:
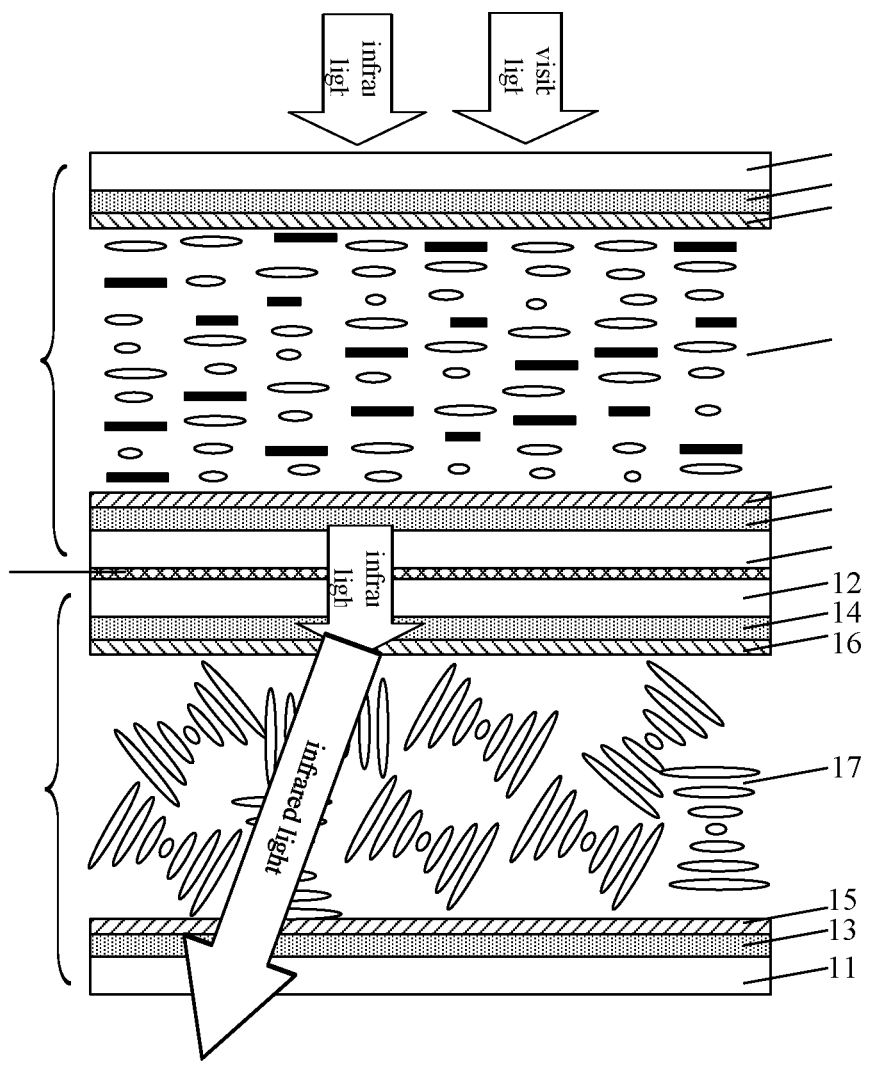
FIG. 4 is a schematic structural diagram of a light adjusting glass, in which a basic light adjusting structure is in a dark state and bistable liquid crystal is in an FC state, according to an embodiment of the present disclosure.

In some implementations, as shown in FIG. 4, when the basic light adjusting structure 20 is in the dark state and the bistable liquid crystal in the functional light adjusting structure 10 is in the FC state, the light adjusting glass is in a scattering dark state, and is actually in a dark state.

In some implementations, when the basic light adjusting structure 20 is in the dark state and the bistable liquid crystal in the functional light adjusting structure 10 is in the P state, the light adjusting glass is in the dark state, and can prevent infrared light.

In some implementations, when the basic light adjusting structure 20 is in the gray scale state, and the bistable liquid crystal in the functional light adjusting structure 10 is in the H state or FC state, the light adjusting glass is in a gray scale state.

Correspondingly, an embodiment of the present disclosure provides a method for manufacturing the above light adjusting glass, which includes: a step of forming the basic light adjusting structure 20 and the functional light adjusting structure 10; and a step of bonding the basic light adjusting structure 20 and the functional light adjusting structure 10 together.

In some implementations, the step of forming the basic light adjusting structure 20 specifically includes the following steps S21 to S23.

S21, forming electrodes respectively on entire surfaces of the third base 21 and the fourth base 22, i.e., forming the third electrode 23 on the third base 21 and forming the fourth electrode 24 on the fourth base 22.

S22, sequentially coating PI (Polyimide) liquid and performing a rubbing process on the third electrode 23 and the fourth electrode 24 to form the third alignment layer 25 and the fourth alignment layer 26; where rubbing directions of the third alignment layer 25 and the fourth alignment layer 26 are antiparallel; and the PI liquid is VA type PI liquid SE-5661.

S23, coating frame sealing glue on the fourth base 22 formed with the fourth alignment layer 26, mixing liquid crystal molecules with dichroic dye molecules to form black dye liquid crystal, and dropping the black dye liquid crystal on the third alignment layer 25; then, aligning and assembling the third base 21 and the fourth base 22 to form a liquid crystal cell, and curing the frame sealing glue through ultraviolet light and heat to form the basic light adjusting structure 20; where, the frame sealing glue is SWB101, the liquid crystal molecules are MDA-18-2030, and a cell thickness of the liquid crystal cell of the basic light adjusting structure 20 is 3.5 μm.

The step of forming the functional light adjusting structure 10 may specifically include the following steps S11 to S13.

S11, forming electrodes respectively on entire surfaces of the first base 11 and the second base 12, i.e., forming the first electrode 13 on the first base 11 and forming the second electrode 14 on the second base 12.

S12, sequentially coating PI liquid and performing a rubbing process on the first electrode 13 and the second electrode 14 to form a first alignment layer 15 and a second alignment layer 16; where rubbing directions of the third alignment layer 25 and the fourth alignment layer 26 are antiparallel; the PI liquid is VA type PI liquid SE-5661.

S13, coating frame sealing glue on the second base 12 formed with the second alignment layer 16, and dropping bistable liquid crystal capable of reflecting infrared light on the third alignment layer 25; then, aligning and assembling the first base 11 and the second base 12 to form a liquid crystal cell, and curing the frame sealing glue through ultraviolet light and heat to form the basic light adjusting structure 20; where, the frame sealing glue is SWB101, liquid crystal molecules are HTW137500-100-01, and a cell thickness of the liquid crystal cell of the functional light adjusting structure 101 is 6 μm.

The step of bonding the basic light adjusting structure 20 and the functional light adjusting structure 10 together may include: bonding the third base 21 of the basic light adjusting structure 20 to the second base 12 of the functional light adjusting structure 10 by adopting a bonding assembly process, so as to form the light adjusting glass with an anti-infrared function.

Referring to FIGS. 5 to 9, an embodiment of the present disclosure provides a light adjusting glass capable of intelligent displaying, which has a structure substantially the same as that of the light adjusting glass capable of reflecting infrared light in the above embodiment, except that the bistable liquid crystal employed in the functional light adjusting structure 10 of the light adjusting glass in the present embodiment is bistable liquid crystal capable of reflecting visible light. Moreover, in order to realize intelligent displaying, as shown in FIG. 10, the first electrode 13 on the first base 11 and the second electrode 14 on the second base 12 in the functional light adjusting glass may be slit electrodes, and are disposed to intersect spatially, that is, a pixel unit is defined at an intersection of the first electrode 13 and the second electrode 14.

It should be noted that the bistable liquid crystal in the present embodiment can only reflect visible light with a specific wavelength, that is, when the light is white light, one of red light, green light and blue light in the white light can be reflected according to the selected bistable liquid crystal.

The basic light adjusting structure 20 in the present embodiment may have the same structure as the basic light adjusting structure 20 in the above embodiment, and therefore, the structure and the display state thereof are not described repeatedly here. For the functional light adjusting structure 10, except for the above differences, the remaining structure and the form that the bistable liquid crystal can exhibit are the same as those of the above-described embodiment, and therefore, the description thereof will not be repeated.

Several display modes of the light adjusting glass are given below.

Figure 5:
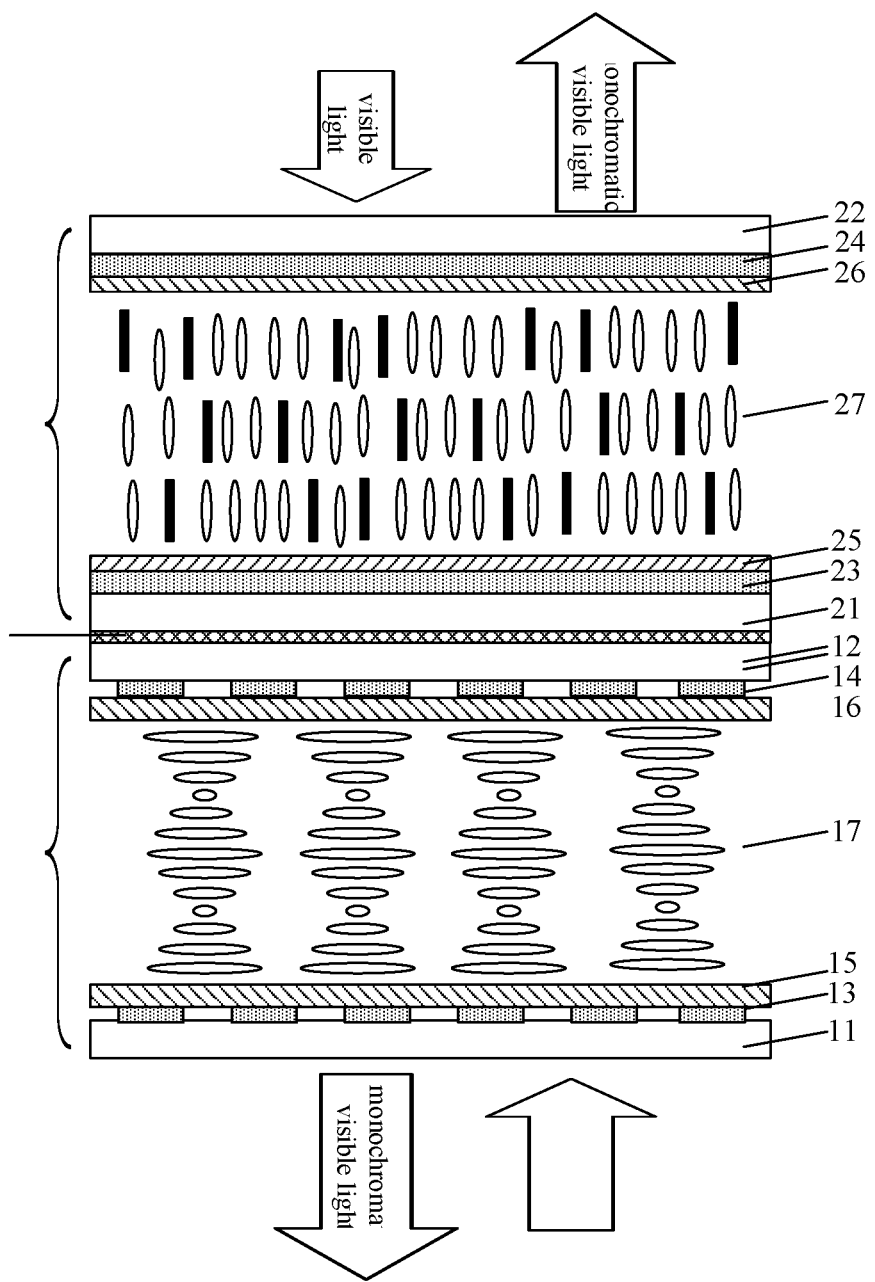
FIG. 5 is a schematic structural diagram of a light adjusting glass, in which a basic light adjusting structure is in a bright state and bistable liquid crystal is in a P state, according to an embodiment of the present disclosure.

In a first display mode, i.e., a dual-sided display mode, as shown in FIG. 5, the basic light adjusting structure 20 is controlled to be in the bright state, the bistable liquid crystal of the functional light adjusting structure 10 is in the P state, and the light adjusting glass exhibits a color of visible light (monochromatic light, such as green light) reflected by the bistable liquid crystal, and displayed information can be seen on both sides of the light adjusting glass. It should be understood that the light adjusting glass in the present embodiment can realize a monochromatic display.

Figure 6:
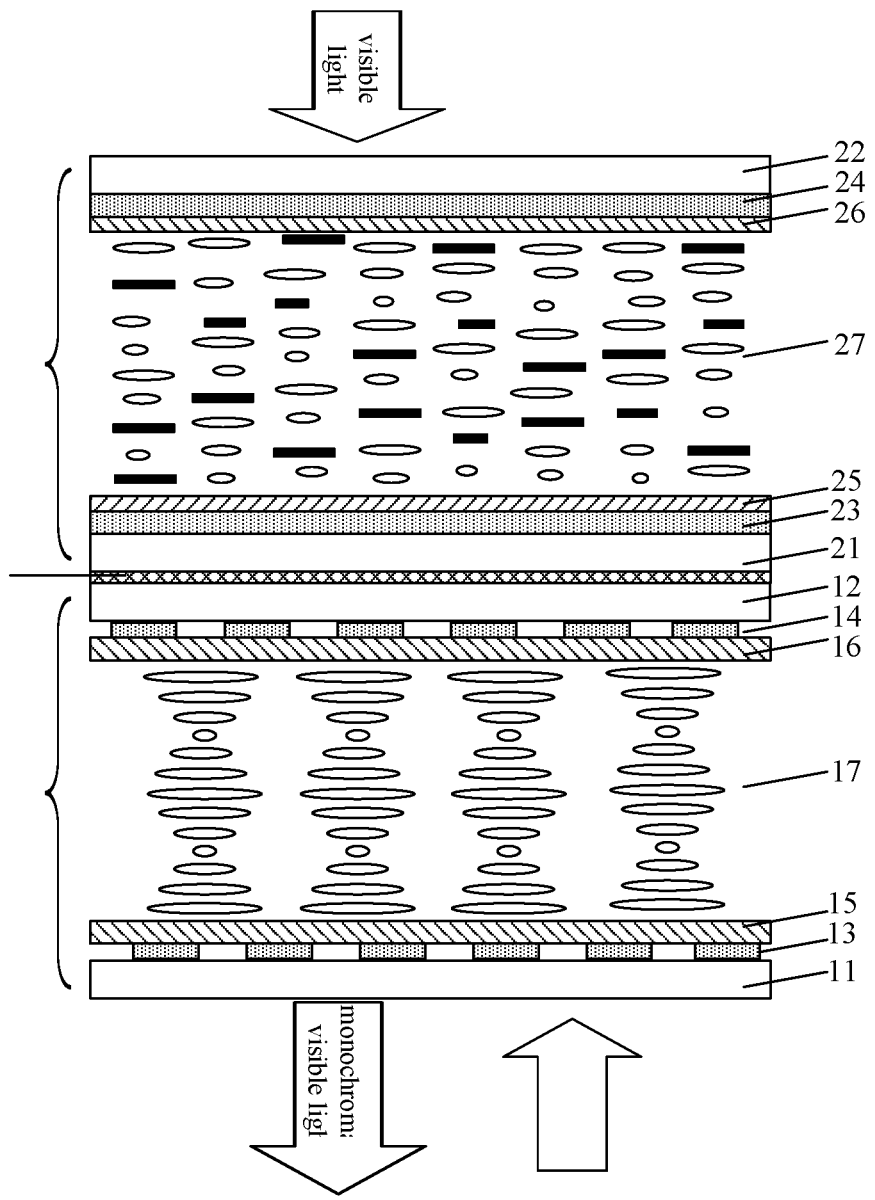
FIG. 6 is a schematic structural diagram of a light adjusting glass, in which a basic light adjusting structure is in a dark state and bistable liquid crystal is in a P state, according to an embodiment of the present disclosure.

In a second display mode, i.e., a black background display mode, as shown in FIG. 6, the basic light adjusting structure 20 is controlled to be in the dark state, the bistable liquid crystal of the functional light adjusting structure 10 is in the P state, the basic light adjusting structure 20 is a non-display region, and only the functional light adjusting structure 10 is a display region, the color of the visible light (e.g., green light) reflected by the bistable liquid crystal is displayed, and the displayed information can be seen only on the side of the functional light adjusting structure 10.

Figure 7:
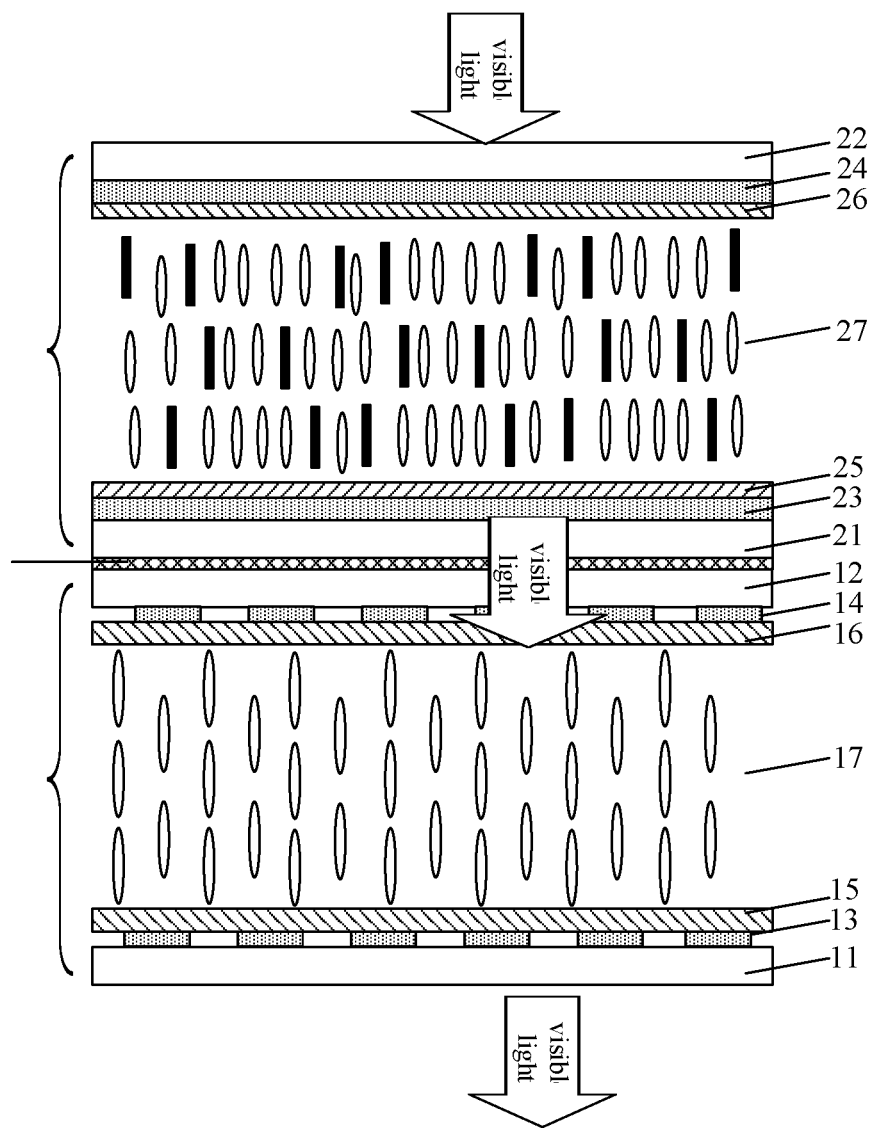
FIG. 7 is a schematic structural diagram of a light adjusting glass, in which a basic light adjusting structure is in a bright state and bistable liquid crystal is in an H state, according to an embodiment of the present disclosure.

In a third display mode, i.e., a bright state display mode, as shown in FIG. 7, the basic light adjusting structure 20 is controlled to be in the bright state, and the bistable liquid crystal of the functional light adjusting structure 10 is in the H state, and the light adjusting glass is in the bright state.

Figure 8:
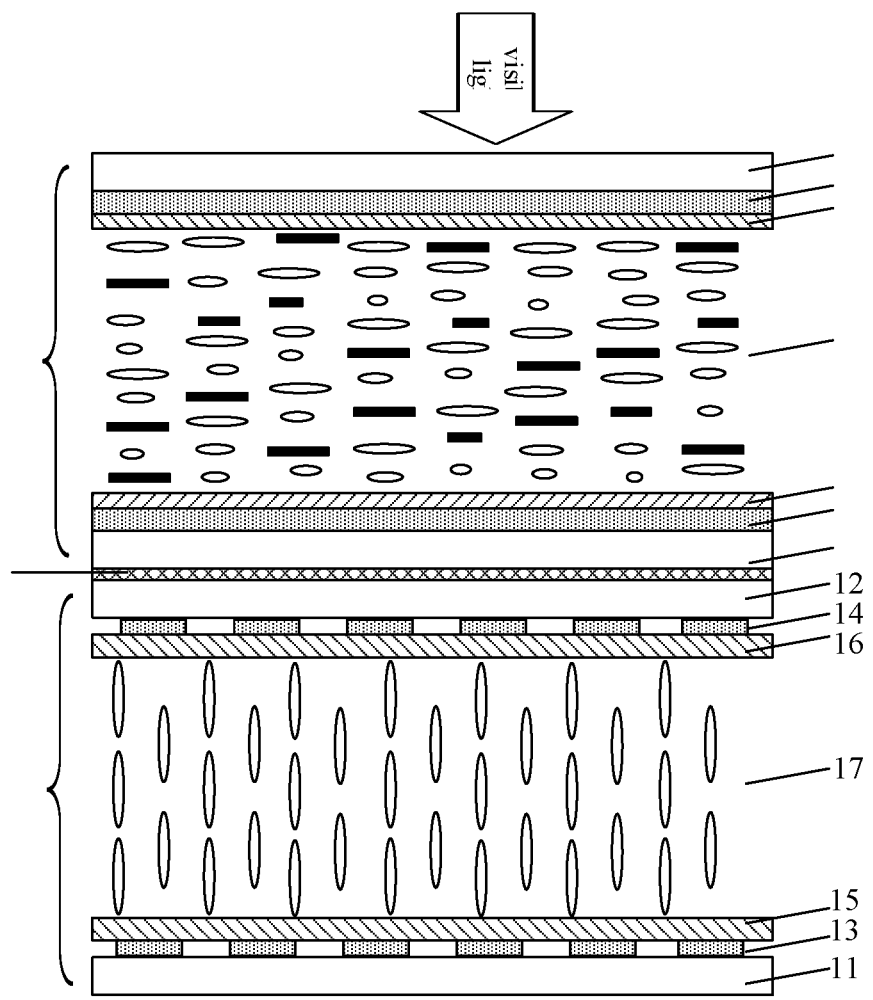
FIG. 8 is a schematic structural diagram of a light adjusting glass, in which a basic light adjusting structure is in a dark state and bistable liquid crystal is in an H state, according to an embodiment of the present disclosure.
Figure 9:
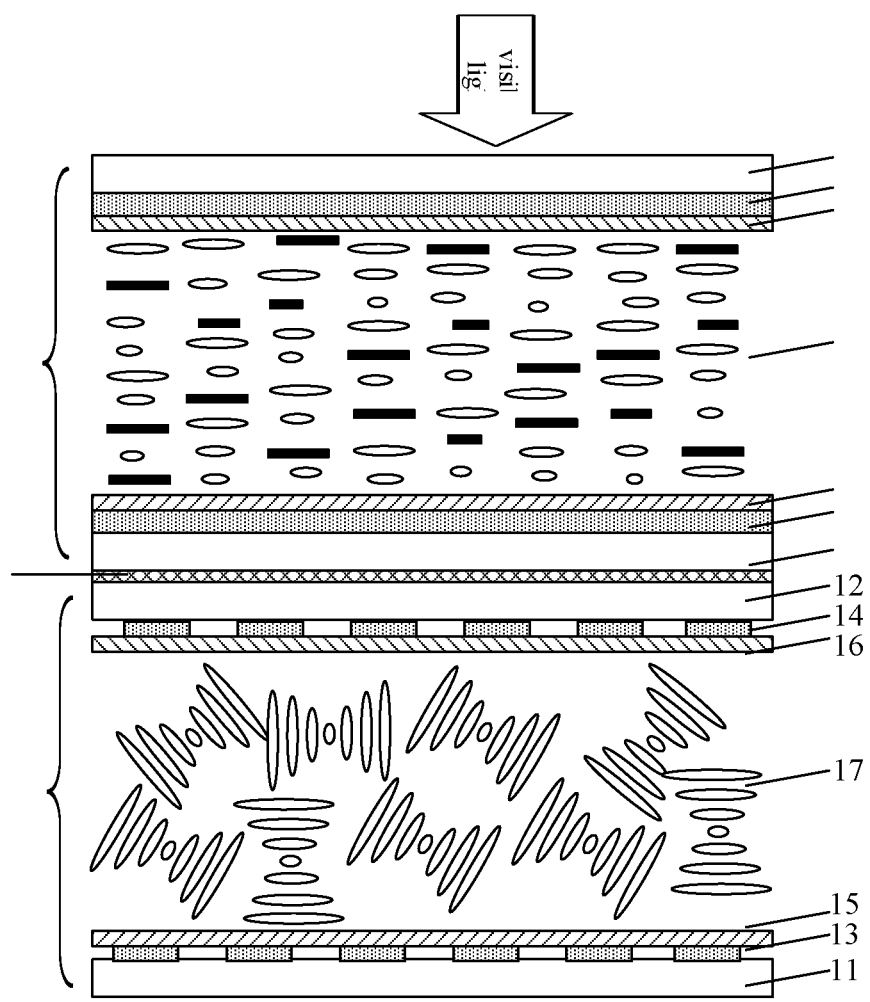
FIG. 9 is a schematic structural diagram of a light adjusting glass, in which a basic light adjusting structure is a dark state and bistable liquid crystal is in an FC state, according to an embodiment of the present disclosure.
Figure 10:
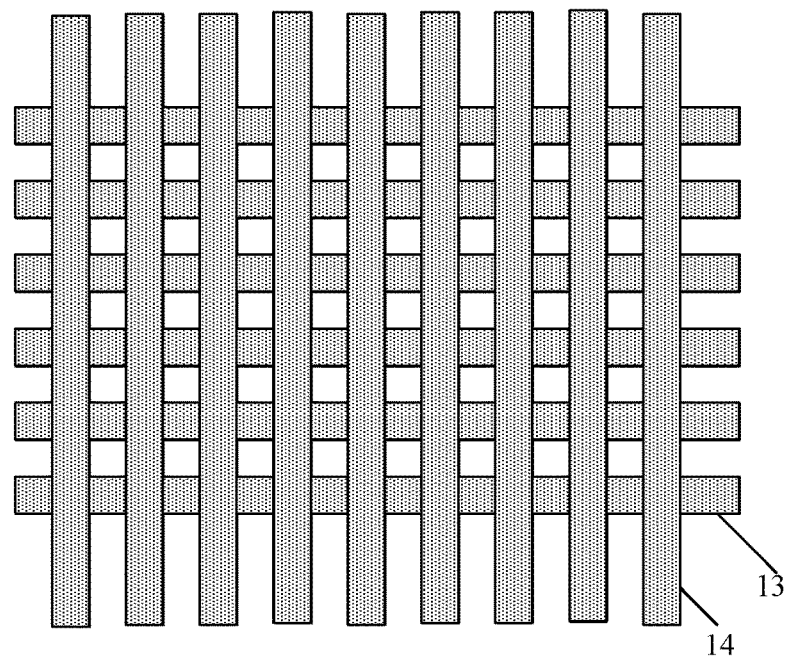
FIG. 10 is a schematic structural diagram of a first electrode and a second electrode in a functional light adjusting structure according to an embodiment of the present disclosure.

In a fourth display mode, i.e., a dark state display mode, as shown in FIGS. 8 and 9, the basic light adjusting structure 20 is controlled to be in the dark state, and the bistable liquid crystal of the functional light adjusting structure 10 is in the FC state or H state, and the light adjusting glass is in the dark state.

In a fifth display mode, i.e., a dark state display mode, the basic light adjusting structure 20 is controlled to be in the gray scale state, the bistable liquid crystal of the functional light adjusting structure 10 is in the FC state or H state, and the light adjusting glass is in the gray scale state.

Correspondingly, an embodiment of the present disclosure further provides a method for manufacturing the light adjusting glass, which includes: a step of forming the basic light adjusting structure 20 and the functional light adjusting structure 10; and a step of bonding the basic light adjusting structure 20 and the functional light adjusting structure 10 together.

In some implementations, the step of forming the basic light adjusting structure 20 specifically includes the following steps S221 to S223.

S221, forming electrodes respectively on entire surfaces of the third base 21 and the fourth base 22, that is, forming the third electrode 23 on the third base 21, and forming the fourth electrode 24 on the fourth base 22.

S222, sequentially coating PI liquid and performing a rubbing process on the third electrode 23 and the fourth electrode 24 to form the third alignment layer 25 and the fourth alignment layer 26; where rubbing directions of the third alignment layer 25 and the fourth alignment layer 26 are antiparallel; and the PI liquid is VA type PI liquid SE-4804.

S223, coating frame sealing glue on the fourth base 22 formed with the fourth alignment layer 26, mixing liquid crystal molecules with dichroic dye molecules to form a black dye liquid crystal, and dropping the black dye liquid crystal on the third alignment layer 25; then, aligning and assembling the third base 21 and the fourth base 22 to form a liquid crystal cell, and curing the frame sealing glue through ultraviolet light and heat to form the basic light adjusting structure 20; where, the frame sealing glue is SWB73, the liquid crystal molecules are BOE-841036, and a cell thickness of the liquid crystal cell of the basic light adjusting structure 20 is 9 μm.

The step of forming the functional light adjusting structure 10 may specifically include the following steps S111 to S113.

S111, forming electrodes respectively on entire surfaces of the first base 11 and the second base 12, that is, forming the first electrode 13 on the first base 11 and forming the second electrode 14 on the second base 12.

S112, sequentially coating PI liquid and performing a rubbing process on the first electrode 13 and the second electrode 14 to form the first alignment layer 15 and the second alignment layer 16; where rubbing directions of the third alignment layer 25 and the fourth alignment layer 26 are antiparallel; the PI liquid is VA type PI liquid SE-4804.

S113, coating frame sealing glue on the second base 12 formed with the second alignment layer 16, and dropping bistable liquid crystal capable of reflecting red light on the third alignment layer 25; then, aligning and assembling the first base 11 and the second base 12 to form a liquid crystal cell, and curing the frame sealing glue through ultraviolet light and heat to form the basic light adjusting structure 20; where the frame sealing glue is SWB73, the liquid crystal molecules are HTW137500-100-02, and a cell thickness of the liquid crystal cell of the functional light adjusting structure 101 is 4 μm.

The step of bonding the basic light adjusting structure 20 and the functional light adjusting structure 10 together may include: bonding the third base 21 of the basic light adjusting structure 20 to the second base 12 of the functional light adjusting structure 10 by adopting a bonding assembly process, so as to form the light adjusting glass with a display function.

In some implementations, the step of forming the basic light adjusting structure 20 may specifically include the following steps S221' to S223'.

S221', forming electrodes respectively on entire surfaces of the third base 21 and the fourth base 22, that is, forming the third electrode 23 on the third base 21, and forming the fourth electrode 24 on the fourth base 22.

S222', sequentially coating PI liquid and performing a rubbing process on the third electrode 23 and the fourth electrode 24 to form a third alignment layer 25 and a fourth alignment layer 26; where rubbing directions of the third alignment layer 25 and the fourth alignment layer 26 are antiparallel; and the PI liquid is VA type PI liquid DL-4018.

S223', coating frame sealing glue on the fourth base 22 formed with the fourth alignment layer 26, mixing liquid crystal molecules with dichroic dye molecules to form black dye liquid crystal, and dropping the black dye liquid crystal on the third alignment layer 25; then, aligning and assembling the third base 21 and the fourth base 22 to form a liquid crystal cell, and curing the frame sealing glue through ultraviolet light and heat to form the basic light adjusting structure 20; where, the frame sealing glue is SWB73, the liquid crystal molecules are BOE-841036, and a cell thickness of the liquid crystal cell of the basic light adjusting structure 20 is 6 μm.

The step of forming the functional light adjusting structure 10 may specifically include the following steps S111' to S113'.

S111', forming electrodes on entire surfaces of the first base 11 and the second base 12, i.e., forming the first electrode 13 on the first base 11 and forming the second electrode 14 on the second base 12, respectively.

S112', sequentially coating PI liquid and performing a rubbing process on the first electrode 13 and the second electrode 14 to form a first alignment layer 15 and a second alignment layer 16; where rubbing directions of the third alignment layer 25 and the fourth alignment layer 26 are antiparallel; and the PI liquid is VA type PI liquid SE-4804.

S113', coating frame sealing glue on the second base 12 formed with the second alignment layer 16, and dropping bistable liquid crystal capable of reflecting green light on the third alignment layer 25; then, aligning and assembling the first base 11 and the second base 12 to form a liquid crystal cell, and curing the frame sealing glue through ultraviolet light and heat to form the basic light adjusting structure 20; where the frame sealing glue is SWB73, the liquid crystal molecules are HTW 137500-100-03, and a cell thickness of the liquid crystal cell of the functional light adjusting structure 101 is 5 μm.

The step of bonding the basic light adjusting structure 20 and the functional light adjusting structure 10 together may include: bonding the third base 21 of the basic light adjusting structure 20 and the second base 12 of the functional light adjusting structure 10 by adopting a bonding assembly process to form the light adjusting glass with a display function.

An embodiment of the present disclosure further provides a writable light adjusting glass, which has a structure substantially the same as that of the light adjusting glass in the above embodiment, except that at least a flexible base is used as the base of the functional light adjusting structure 10 distal from the basic light adjusting glass 20 in the present embodiment. That is, the first base 11 in the functional light adjusting structure 10 may be a flexible base, or both the first base 11 and the second base 12 may be flexible bases. In such way, when a user writes on the first base 11 through a stylus pen, the bistable liquid crystal is converted from the FC state to the P state under a pressure applied by the stylus pen or a voltage provided by the stylus pen, so as to realize a writable function of the light adjusting glass.

The remaining structures and manufacturing method of the light adjusting glass in the present embodiment are the same as those of the light adjusting glass in the above embodiment, and therefore are not described in detail here.

Figure 11:
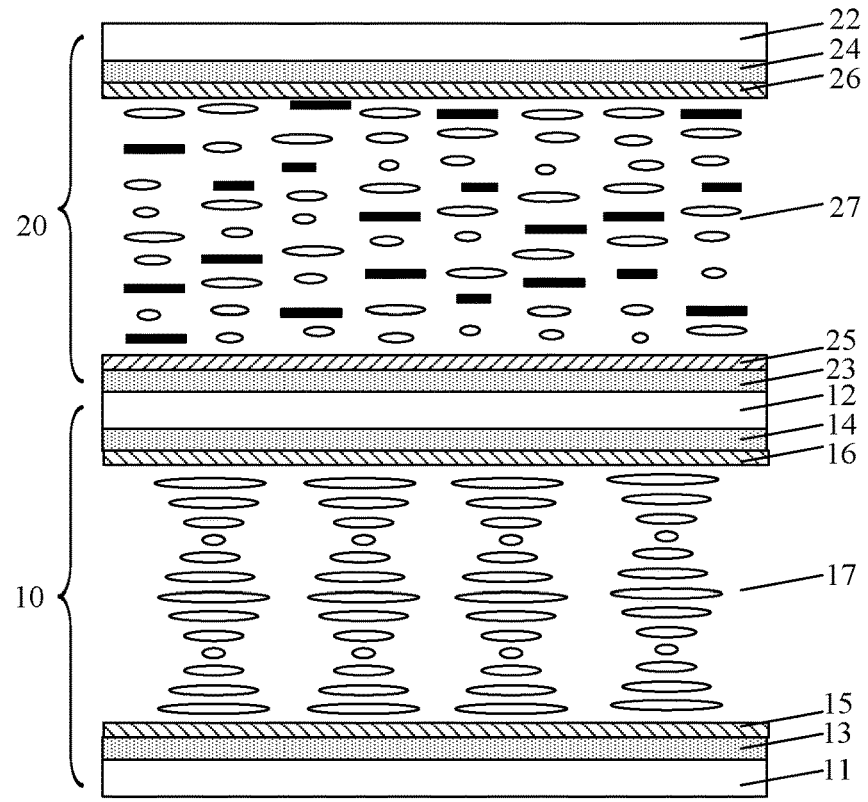
FIG. 11 is a schematic structural diagram of a light adjusting glass according to an embodiment of the present disclosure.

As shown in FIG. 11, an embodiment of the present disclosure further provides a light adjusting glass, the structure of the light adjusting glass in the present embodiment is similar to that of the light adjusting glass in the above embodiment, and the functional light adjusting structure 10 and the basic light adjusting structure 20 of the light adjusting glass each adopt a liquid crystal cell structure. That is, the functional light adjusting structure 10 may include a first base 11 and a second base 12 which are disposed opposite to each other, a first electrode 13 disposed on a side of the first base 11 proximal to the second base 12, a second electrode 14 disposed on a side of the second base 12 proximal to the first base 11, and a first liquid crystal layer 17 disposed between the first electrode 13 and the second electrode 14; the basic light adjusting structure 20 may include a third base 21 and a fourth base 22 which are disposed opposite to each other, a third electrode 23 disposed on a side of the third base 21 proximal to the fourth base 22, a fourth electrode 24 disposed on a side of the fourth base 22 proximal to the third base 21, and a second liquid crystal layer 27 disposed between the third electrode 23 and the fourth electrode 24. The light adjusting glass in the present embodiment is different from the light adjusting glass in the above-described embodiment in that, in the present embodiment, the second base 12 in the functional light adjusting structure 10 is common to the third base 21 in the basic light adjusting structure 20. That is, the light adjusting glass in the present embodiment uses three bases (e.g., glass bases) without the adhesive layer 30. The light adjusting glass in the present embodiment is simple in structure, and a thickness of the light adjusting glass can be effectively reduced.

It should be noted that other structures of the light adjusting glass of the present embodiment may be the same as those in the above embodiment, and therefore, are not described in detail herein.

An embodiment of the present disclosure further provides a light adjusting glass, which includes a basic light adjusting structure 20 and a functional light adjusting structure 10 that are disposed in a laminated mode; the functional light adjusting structure 10 may adopt any one functional light adjusting structure in the above embodiment, and the basic light adjusting structure 20 may adopt an electro-chromic structure.

Specifically, the basic light adjusting structure may include a third substrate, a fourth substrate, and an electro-chromic layer interposed between the third substrate and the fourth substrate; where the electro-chromic layer controls light to transmit there-through or not under the control of an electric field generated between the third substrate and the fourth substrate.

The light adjusting glass provided in the present embodiment can achieve the same effects as the light adjusting glass in the above embodiments, and will not be described in detail herein.

Similar to the above-described embodiment, the functional light adjusting structure in the present embodiment may include a first base and a second base which are disposed opposite to each other, a first electrode disposed on a side of the first base proximal to the second base, a second electrode disposed on a side of the second base proximal to the first base, and a first liquid crystal layer disposed between the first electrode and the second electrode; the basic light adjusting structure may include a third base and a fourth base which are disposed opposite to each other, a third electrode disposed on a side of the third base proximal to the fourth base, a fourth electrode disposed on a side of the fourth base proximal to the third base, and an electro-chromic layer disposed between the third electrode and the fourth electrode; where the second base is common to the third base. That is, the light adjusting glass in the present embodiment uses three glass bases without using an adhesive layer. The light adjusting glass in the present embodiment is simple in structure, and a thickness of the light adjusting glass can be effectively reduced.

It should be noted that, in the above embodiments, the first electrode and the second electrode in the functional light adjusting structure are plate-shaped electrodes, and the third electrode and the fourth electrode in the basic light adjusting structure are plate-shaped electrodes, but in practical applications, when the liquid crystal molecules are positive liquid crystal molecules, the first electrode and the second electrode can form a TN-type electric field after voltages are applied thereto; the first electrode and the second electrode may be both disposed on the first base, and in such case, the first electrode and the second electrode are sequentially disposed along a direction away from the first base, the first electrode may be a plate-shaped electrode, the second electrode may be a slit electrode, and when voltages are applied to the first electrode and the second electrode, an FFS type (or ADS type) electric field can be formed; or the first electrode and the second electrode may each adopt a slit electrode, and are alternately disposed on the first base, and an IPS type electric field can be formed when voltages are applied to the first electrode and the second electrode.

Accordingly, a mode of the electric field between the third electrode and the fourth electrode in the basic light adjusting structure may be the same as that between the first electrode and the second electrode in the functional light adjusting structure, and a description thereof is omitted.

It should be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A light adjusting glass, comprising: a basic light adjusting structure and a functional light adjusting structure which are disposed in a laminated manner; wherein,
the basic light adjusting structure is configured to adjust a transmittance of light rays irradiated on the basic light adjusting structure;
the functional light adjusting structure is configured to reflect light rays in a specific wave band irradiated on the functional light adjusting structure,
wherein the functional light adjusting structure comprises: a first substrate and a second substrate which are disposed opposite to each other; and a first liquid crystal layer interposed between the first substrate and the second substrate; wherein,
the first liquid crystal layer is configured to reflect light rays in the specific wave bands under an action of an electric field generated between the first substrate and the second substrate,
wherein the first substrate comprises a first base, and a first electrode disposed on a side of the first base proximal to the first liquid crystal layer;
the second substrate comprises a second base and a second electrode disposed on a side of the second base proximal to the first liquid crystal layer; wherein,
the first electrode and the second electrode are both slit electrodes, and the first electrode and the second electrode are disposed in a crossed mode.

2. The light adjusting glass of claim 1, wherein the first liquid crystal layer comprises a bistable liquid crystal layer.

3. The light adjusting glass of claim 1, wherein
at least one of the first base and the second base proximal to the basic light adjusting structure is a flexible substrate.

4. The light adjusting glass of claim 1, wherein the basic light adjusting structure comprises a third substrate, a fourth substrate, and a second liquid crystal layer interposed between the third substrate and the fourth substrate; wherein,
the second liquid crystal layer includes basic liquid crystal molecules and dichroic dye molecules, and is configured to be deflected under the control of an electric field generated between the third substrate and the fourth substrate, so as to control the transmittance of light rays.

5. The light adjusting glass of claim 4, wherein the second liquid crystal layer includes chiral additive therein.

6. The light adjusting glass of claim 4, wherein the third substrate comprises a third base, and a third electrode disposed on a side of the third base proximal to the second liquid crystal layer;
the fourth substrate comprises a fourth base and a fourth electrode disposed on a side of the fourth base proximal to the second liquid crystal layer; wherein,
the third electrode and the fourth electrode are both plate-shaped electrodes.

7. The light adjusting glass of claim 1, wherein the basic light adjusting structure comprises a third substrate, a fourth substrate, and an electro-chromic layer interposed between the third substrate and the fourth substrate; wherein,
the electro-chromic layer controls light to transmit therethrough or not under the control of an electric field generated between the third substrate and the fourth substrate.

8. The light adjusting glass of claim 1, wherein
the basic light adjusting structure comprises a third base and a fourth base which are disposed opposite to each other, a third electrode disposed on a side of the third base proximal to the fourth base, a fourth electrode disposed on a side of the fourth base proximal to the third base, and a second liquid crystal layer disposed between the third electrode and the fourth electrode; wherein,
the second base is common to the third base.

9. The light adjusting glass of claim 1, wherein
the basic light adjusting structure comprises a third base and a fourth base which are disposed opposite to each other, a third electrode disposed on a side of the third base proximal to the fourth base, a fourth electrode disposed on a side of the fourth base proximal to the third base, and an electro-chromic layer disposed between the third electrode and the fourth electrode; wherein,
the second base is common to the third base.

10. A light adjusting glass, comprising: a basic light adjusting structure and a functional light adjusting structure which are disposed in a laminated manner; wherein,
the basic light adjusting structure is configured to adjust a transmittance of light rays irradiated on the basic light adjusting structure;
the functional light adjusting structure is configured as being capable of reflecting infrared light irradiated on the functional light adjusting structure, and
wherein the functional light adjusting structure comprises: a first substrate and a second substrate which are disposed opposite to each other; and a first liquid crystal layer interposed between the first substrate and the second substrate;
the first liquid crystal layer is configured as being capable of reflecting infrared light under an action of an electric field generated between the first substrate and the second substrate,
the first liquid crystal layer comprises a bistable liquid crystal layer being capable of reflecting infrared light,
the first substrate comprises a first base, and a first electrode disposed on a side of the first base proximal to the first liquid crystal layer,
the second substrate comprises a second base and a second electrode disposed on a side of the second base proximal to the first liquid crystal layer, and
the first electrode and the second electrode are both plate-shaped electrodes.

* * * * *